(12) United States Patent
Yang et al.

(10) Patent No.: US 9,585,106 B2
(45) Date of Patent: Feb. 28, 2017

(54) NETWORK-ASSISTED CHANNEL SELECTION AND POWER CONTROL FOR MOBILE DEVICES

(71) Applicant: Taiwan Semiconductor Manufacturing Company, Ltd., Hsinchu (TW)

(72) Inventors: Shu-hao Yang, Taiwan (CN); Li-chun Wang, Taiwan (CN); Jane-hwa Huang, Taiwan (CN); Ang-hsun Tsai, Taiwan (CN)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 14/668,641

(22) Filed: Mar. 25, 2015

(65) Prior Publication Data

US 2015/0282184 A1    Oct. 1, 2015

Related U.S. Application Data

(60) Provisional application No. 61/971,394, filed on Mar. 27, 2014.

(51) Int. Cl.
*H04B 7/00* (2006.01)
*H04W 52/26* (2009.01)
(Continued)

(52) U.S. Cl.
CPC ......... *H04W 52/265* (2013.01); *H04L 1/0009* (2013.01); *H04W 52/243* (2013.01);
(Continued)

(58) Field of Classification Search
CPC .. H04L 5/003; H04W 52/243; H04W 52/265; H04W 52/367; H04W 52/383
(Continued)

(56) References Cited

U.S. PATENT DOCUMENTS 6,493,331 B1 * 12/2002 Walton .................. H04W 52/24
                                                    370/329
8,521,208 B2 *  8/2013 Li ........................ H04W 52/241
                                                    455/13.1
(Continued)

FOREIGN PATENT DOCUMENTS

CN    102857874 A    1/2013
CN    102858012 A    1/2013
(Continued)

OTHER PUBLICATIONS

International Search Report for PCT Application No. PCT/CN2015/075229 dated Jun. 29, 2015, 4 pages.
(Continued)

*Primary Examiner* — Tan H Trinh
(74) *Attorney, Agent, or Firm* — Haynes and Boone, LLP

(57) ABSTRACT

Facilitation of a network assisted device-decided system can increase throughput of D2D devices and the link reliability of macrocells. In a network assisted device-decided system a macrocell can broadcast resource allocation data to D2D devices. The D2D devices can then select channels and adjust transmission power to offload traffic from the macrocell, thus creating a high spectrum efficiency with low power.

9 Claims, 12 Drawing Sheets

(51) Int. Cl.
*H04W 52/24* (2009.01)
*H04W 52/36* (2009.01)
*H04W 52/38* (2009.01)
*H04L 1/00* (2006.01)
*H04L 5/00* (2006.01)

(52) U.S. Cl.
CPC ....... *H04W 52/367* (2013.01); *H04W 52/383* (2013.01); *H04L 5/003* (2013.01); *Y02B 60/50* (2013.01)

(58) Field of Classification Search
USPC ....... 455/513, 220, 522, 69, 63.1, 512, 13.1; 370/252, 329, 330, 235, 294
See application file for complete search history.

(56) References Cited

U.S. PATENT DOCUMENTS

| | | | | |
|---|---|---|---|---|
| 9,253,778 | B2* | 2/2016 | Ye | H04W 72/0453 |
| 2004/0120290 | A1* | 6/2004 | Makhijani | H04W 72/082 370/335 |
| 2005/0135284 | A1* | 6/2005 | Nanda | H04L 29/06068 370/294 |
| 2011/0122769 | A1* | 5/2011 | Zhang | H04B 3/54 370/235 |
| 2011/0300892 | A1* | 12/2011 | Hakola | H04W 72/085 455/512 |
| 2012/0170466 | A1* | 7/2012 | Lee | H04W 24/02 370/252 |
| 2013/0003666 | A1* | 1/2013 | Oh | H04W 72/082 370/329 |
| 2013/0064188 | A1* | 3/2013 | Tseng | H04W 16/12 370/329 |
| 2013/0288608 | A1* | 10/2013 | Fwu | H04W 72/02 455/63.1 |
| 2014/0003262 | A1* | 1/2014 | He | H04W 28/08 370/252 |
| 2014/0015330 | A1* | 1/2014 | Byun | H02J 5/005 307/104 |
| 2014/0086200 | A1* | 3/2014 | Seok | H04W 72/02 370/330 |
| 2014/0321304 | A1* | 10/2014 | Yu | H04L 5/00 370/252 |
| 2015/0078369 | A1* | 3/2015 | Khude | H04W 56/0015 370/350 |
| 2015/0098332 | A1* | 4/2015 | Eriksson | H04L 47/14 370/235 |
| 2015/0117375 | A1* | 4/2015 | Sartori | H04W 56/001 370/329 |
| 2015/0195781 | A1* | 7/2015 | Yi | H04W 52/04 455/452.2 |

FOREIGN PATENT DOCUMENTS

| | | |
|---|---|---|
| CN | 103249007 A | 8/2013 |
| WO | 2011151508 A1 | 12/2011 |

OTHER PUBLICATIONS

Doppler, et al., "Device-to-Device Communication as an Underlay to LTE-Advanced Networks," Topics in Radio Communications, IEEE Communications Magazine, Dec. 2009, pp. 42-49, vol. 47, No. 12. IEEE, 8 pages.

Corson, et al., "Toward Proximity-Aware Internetworking," IEEE Wireless Communications, Dec. 2010, pp. 26-33, vol. 17, No. 6, 8 pages.

Yu, et al., "Resource Sharing Optimization for Device-to-Device Communication Underlaying Cellular Networks," IEEE Transactions on Wireless Communications, Aug. 2011, pp. 2752-2763, vol. 10, No. 8, 12 pages.

Lei, et al., "Operator Controlled Device-to-Device Communications in LTE-Advance Networks," IEEE Wireless Communications, Jun. 2012, pp. 96-104, vol. 19, No. 3, 9 pages.

Min, et al., "Capacity Enhancement Using an Interference Limited Area for Device-to-Device Uplink Underlaying Cellular Networks," IEEE Transactions on Wireless Communications, Dec. 2011, pp. 3995-4000, vol. 10, No. 12, 6 pages.

Tsai, et al., "Intelligent Resource Management for Device-to-Device (D2D) Communications in Heterogeneous Networks," Proc. International Symposium on Wireless Personal Multimedia Communications (WPMC), Sep. 2012, pp. 75-79, 5 pages.

"Further Advancements for E-UTRA Physical Layer Aspects," 3GPP TR 36.814, 2010, 104 pages, vol. 9. 3GPP Organizational Partners.

Erceg et al., "Channel Models for Fixed Wireless Applications," IEEE, TR 802.16, Jul. 2001, 36 pages.

Lee, et al., "Distributed Channel Selection Principles for Femtocells with Two-tier Interference," IEEE Vehicular Technology Conference (VTC-Spring), May 2010, IEEE, 5 pages.

Yaniv, et al., "CINR Measurements Using the EESM Method," IEEE, TR 802.16, Apr. 2005, 19 pages.

Yang, et al., Network-assisted Device-decided Channel Selection and Power Control for Multi-pair Device-to-Device (D2D) Communications in Heterogeneous Networks, 2014, 6 pages.

* cited by examiner

NETWORK-ASSISTED CHANNEL SELECTION AND POWER CONTROL FOR MOBILE DEVICES

RELATED APPLICATION

This application claims priority to U.S. Provisional Application No. 61/971,394, filed Mar. 27, 2014, and entitled "Network-assisted Device-decided Channel Selection and Power Control for Multi-pair Device-to-Device (D2D) Communications in Heterogeneous Networks," which application is hereby incorporated by reference in its entirety.

TECHNICAL FIELD

This disclosure relates generally to network-assisted channel selection and power control for multi-pair device-to-device communications in a heterogeneous network.

BACKGROUND

Device-to-device (D2D) communication is a low-power capacity enhancement technique, which can improve spectrum efficiency and also offload traffic from a macro-eNB network. D2D communication can provide enhanced system capacity with low power for ubiquitous broadband wireless applications. Although D2D communication can take place without the assistance of a macro-eNB, D2D devices and existing macro cell systems can concurrently reuse an available spectrum.

However, within a macro/femto/D2D heterogeneous network, a multi-tier interference problem can arise. Aggregated interference from multiple D2D communication pairs can interfere with the macro-User Equipment's (UE) signal. When femtocells adaptively allocate channels and transmission power for femto-UEs, different D2D devices can experience various femto-to-device interference strength. Furthermore, the femto-to-device interference strength can also be time varying.

The aforementioned presents challenges in resource allocation for macro/femto/D2D heterogeneous networks because the macro-eNB is unaware of the interference situation of each D2D device. Therefore a system to jointly allocate the channels and adjust power for multiple D2D devices in a macro/femto/D2D heterogeneous network can achieve reduced device-to-macro interference, reduced control signaling, and increased D2D throughput.

The above-described background relating to network-assisted channel selection and power control for multi-pair device-to-device communications is merely intended to provide a contextual overview of some current issues, and is not intended to be exhaustive. Other contextual information may become further apparent upon review of the following detailed description.

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure. Its sole purpose is to present some concepts of the disclosed subject matter in a simplified form as a prelude to the more detailed description that is presented later.

An embodiment of the presently disclosed subject matter can be in the form of a method. The method can include a method for sending preferred sub-channel data representing a set of preferred sub-channels enabling connection of the device to a network device of a network; and receiving resource allocation instruction data comprising power data representing an allowable transmission power of each preferred sub-channel. The method can select at least one preferred sub-channel from the set of preferred sub-channels to increase a data throughput of the device, wherein the selecting comprises determining the at least one preferred sub-channel at least in part based on information received from the network device. Furthermore, the method can select a transmission power of the device in accordance with the corresponding at least one preferred sub-channel.

According to another embodiment, of the presently disclosed subject matter can be in the form of an apparatus. The apparatus can initiate sending of preferred network channel data representing a set of preferred network channels of the apparatus used to connect to a set of network devices of a network; and receiving resource allocation instruction data comprising power data representing an allowable transmission power of the apparatus. The apparatus can select a network channel of the apparatus, from the set of preferred network channels, to increase a data throughput of the apparatus, wherein the selecting comprises determining the network channel, at least in part, based on information received from a network device of the set of network devices. The apparatus can also select a transmission power of the apparatus in accordance with the resource allocation instruction data, wherein the selecting the transmission power adjusts an interference of the device contributed to by the set of preferred network channels.

According to yet another embodiment, an article of manufacture, such as a computer readable storage medium or the like, can store instructions that, when executed by a computing device, can facilitate receiving preferred channel data representing a set of preferred channels from a mobile device and determining an allowable transmission power for the mobile device. The computer readable storage medium can also generate resource allocation instruction data comprising power data representing an allowable transmission power for the mobile device and broadcast the resource allocation instruction data to the mobile device.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
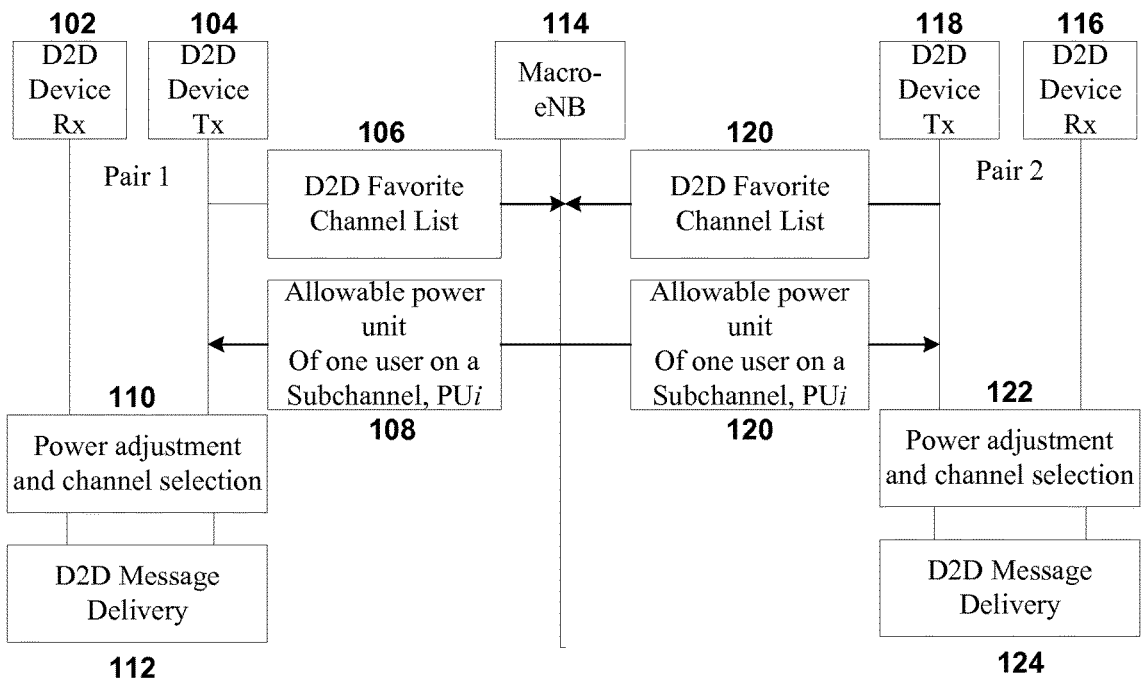
FIG. 1 illustrates a network assisted device-decided resource allocation method according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above identified deficiencies and other drawbacks of public wireless networks, various embodiments are described herein to facilitate the use of public wireless networks in a secure means.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

As an overview of the various embodiments presented herein, to correct for the above-identified deficiencies and other drawbacks of traditional macro/femto/D2D heterogeneous networks various embodiments are described herein to facilitate an improvement in throughput.

Described herein are systems, methods, articles of manufacture, and other embodiments or implementations that can facilitate increased heterogeneous throughput via channel and selection and transmission power adjustment. Facilitating increased network throughput can be implemented in connection with any type of device with a connection to a communications network (a wireless communications network, the Internet, or the like), such as a mobile handset, a computer, a handheld device, or the like.

Device-to-device (D2D) device and macrocell systems can concurrently reuse an available spectrum. Therefore, D2D communications have advantages of high spectrum efficiency with low power, macrocell offloading, and ubiquitous high-rate coverage. However, an aggregated interference from multiple D2D communication pairs can interfere with macro-user equipment (UE) signals. Furthermore, when femtocells adaptively allocate the channels and transmission power for femto-UEs, different D2D devices can experience various femto-to-device interference strength, which are also time-varying. Challenges of allocating resources for macro/femto/D2D 3-tier heterogeneous networks can result from macro-eNBs not knowing the interference situation of each D2D device.

Resource management methods for heterogeneous networks can be classified into three main categories: device-controlled methods, network-controlled device-assisted methods, and network-assisted device-decided (NADD). The device-controlled method can decide the power and channel associated with a D2D device. The devices can register to a D2D server, and then can communicate to the nearby registered devices. Nevertheless, the device-controlled method can result in harmful interference to the macrocells if the aggregated device-to-macro interference is not controlled accurately. In the network-controlled device-assisted method, each D2D device can report the instantaneous information of its communication state to the macro-eNB, including instantaneous network load, channel conditions, and interference strength. The macro-eNB can allocate the radio resource to the D2D devices while ensuring the performance of macro-UEs. By proper power control and mode selection, the network can improve the overall system performance. The D2D devices can then report their channel state information and signal quality in terms of a channel quality indication (CQI) to the macro-eNB. Consequently, the macro-eNB can properly determine the allocated channels for the devices. In an interference-limited-area (ILA) control method, according to channel state information reported from each device, the macro-eNB can respectively determine the protection area for each device. Then, within the protection area of a device, the device and the macro-UEs can be allocated with different channels, thereby improving the throughput of D2D systems. For the network-assisted device-decided method, the devices can select suitable channels and adjust the transmission power according to a minimum transmit power criterion and the power control instruction from the eNB.

In the heterogeneous networks, to ensure the link reliability of macro-UE, the macro-eNB can control the aggregate interference from multiple D2D devices to the macro-UE. Furthermore, since the macro-eNB can not know the interference situation of each device, the D2D device can select channels and power levels. In the NADD system, the macro-eNB can broadcast the resource allocation instructions for all D2D devices to limit the transmission power of devices, so as to ensure the link reliability of macro-UE. According to this assistant resource allocation instruction, the D2D devices can select favorite channels and adjust to an optimal power. For a fixed power system, all of the D2D devices can transmit with a predefined power. However, the NADD power control system can be a centrally-controlled method in which the macro-eNB estimates the number of D2D devices, and then broadcasts power control instructions to the D2D devices. The devices can then randomly select channels, as the devices do in the fixed power system.

D2D devices can exploit the uplink spectrum of the macrocell system to perform direct D2D communications. If the propagation distance between a transmitter and a receiver is d (km), and both the transmitter and the receiver are within the same building, the path loss can be modeled as $$L(d)=127+30 \log_{10}(d) \text{ (dB)}, \quad (1)$$

and for other cases, the path loss can be modeled as $$L(d)=128.1+37.6 \log_{10}(d) \text{ (dB)}. \quad (2)$$

If the signal penetrates through the wall(s), the wall penetration loss can be 20 dB per wall. Shadowing can be modeled as a log-normal random variable $10^{\epsilon/10}$, where $\epsilon$ is a Gaussian distributed random variable with zero mean. For the case that both the transmitter and the receiver being within the same building have an indoor link, the shadowing standard deviation can be $\sigma=10$ dB. For other cases, $\sigma=8$ dB. Multipath fading can be described by the Stanford University interim-3 (SUI-3) channel model that assumes three taps with non-uniform delays.

NADD resource allocation can control the interference from the D2D devices to the macro-UEs with less signaling overhead and enhance the throughput of D2D communications. The aggregate interference from multiple D2D transmissions can corrupt the signal quality of macro-UEs, and having different numbers of neighbouring femtocells around can cause different D2D devices to suffer from various femto-to-device interference strength. Because the channel and power allocation of femtocell is adaptively changing, the femto-to-device interference strength of one D2D device also fluctuate over time. Hence, only the D2D device itself can fully know its interference situation, and the macro-eNB cannot learn the interference strengths of devices.

In the network-assisted (NA) part of NADD method, each D2D device can report a favorite channel list to the macro-eNB. The NA part is first conducted to prevent multiple D2D pairs from causing harmful interference to the macro-eNB. According to these favorite channel lists uploaded by the devices, the macro-eNB can calculate the maximum allowable power unit $PU_i$ of one device on a subchannel. The macro-eNB can take the maximum allowable power units of all subchannels as a resource allocation instruction and broadcast it to the D2D devices. Consequently, the macro-eNB can assist the D2D devices in adjusting power to control the device-to-macro interference. In the device-decided (DD) part, following the assistant resource allocation instruction broadcasted by the macro-eNB, the D2D devices can select the proper subchannels and transmission power to enhance the D2D throughput. Moreover, the NADD method supports dynamic resource allocation since the channel usage of macro/femto users varies with time.

P is the transmission power. h is the instantaneous link gain including the effects of pathloss, shadowing, wall penetration loss, and frequency selective fading. l is the average link gain including the effects of pathloss, shadowing, and wall penetration loss, that is, it does not include the impact due to frequency selective fading. The subscripts M and F denote the M-th macro-eNB, and F-th femto-eNB. The subscripts m, f, and d denotes the m-th macro-UE, f-th femto-UE, and d-th D2D-UE. Besides, the subscripts i and j denotes the i-th subchannel, and j-th subcarrier. For example, $l_{m,M,i}$ means average link gain of the i-th subchannel from the transmitter (the m-th macro-UE) to the receiver (the M-th macro-eNB).

The NADD method can have each device transmit a favorite channel list to the macro-eNB to notify the macro-eNB of the channels suitable for the device to perform D2D communications. If $N_{subch}$ is the total number of subchannels, and $\rho_D$ represents the D2D channel usage ratio, which is defined as the proportion of maximum allowable number of subchannels used by one device to the number of total subchannels, then each device can employ at most $\rho_D N_{subch}$ subchannels for D2D communications. In the macro/femto/D2D heterogeneous networks, the aggregate interference strength from the neighboring femtocells can rapidly vary over time. A maximum link-gain channel selection method can achieve better throughput in a heterogeneous network. Hence, for the same reason, in the NADD method, each device can select $\rho_D N_{subch}$ subchannels with higher link gains as the favorite channels, after measuring the link gains of all subchannels. $\rho_F$ can be the femto channel usage ratio, defined as the ratio of maximum allowable number of subchannels used by one femtocell to the number of total subchannels. The femto-UE can randomly select $\rho_F N_{subch}$ subchannels for data transmission.

If the D2D channel usage ratio is $\rho_D$, the femto channel usage ratio is $\rho_F$, and the total number of subchannels for data transmission is $N_{subch}$, then the transmit device can measure the link gain of the D2D pair and selects $\rho_D N_{subch}$ subchannels with higher link gain as the favorite channels. Femto-UEs can randomly select $\rho_F N_{subch}$ subchannels for data transmission.

For ensuring the link reliability of macro-UEs, the network-assisted power control can aim to adjust the transmission power of multiple devices, so as to keep the uplink SINR of macro-UE to be above a SINR target $\gamma_{target}$. Hence, $$SINR_{Macro} = \frac{P_{m,i} l_{m,M,i}}{PU_i^{total} + N_0} \geq \gamma_{target} \quad (3)$$

where $SINR_{Macro}$ is the uplink SINR for the transmission from the m-th macro-UE to the M-th macro-eNB, using the i-th subchannel with the transmission power $P_{m,i}$. $l_{m,M,i}$ is the average link gain of the i-th subchannel. $N_0$ is the noise power. In the denominator of (3), $PU_i^{total}$ represents the total interference to the m-th macro-UE on the i-th subchannel, caused by all the devices and femto-UEs. With the resource allocation instruction, the NADD method can control the total interference to the macro-UE, $PU_i^{total}$, by adjusting the transmission power of the devices and femto-UEs. Therefore, $PU_i^{total}$ can be retreated as the total power units for the devices and femto-UEs on the i-th subchannel. From (3), the upper limit of total allowable power units on the i-th subchannel can be computed as $$PU_{i,max}^{total} = \left(\frac{P_{m,i} l_{m,M,i}}{\gamma_{target}} - N_0\right). \quad (4)$$

By observing all the favorite channel lists of the D2D devices, the macro-eNB can count the number $N_{DUE,i}$ of D2D devices that prefer the i-th subchannel to perform the D2D communications. Let $N_{FUE}$ be the total number of femto-UEs with the considered macrocell. Since the femto channel usage ratio is $\rho_F$, there are $N_{FUE,i} = \rho_F N_{FUE}$ femto-UEs selecting the i-th subchannel for data transmissions, on the average. If the power allocation r is the proportion of total allowable power units that are allocated for D2D communications, and (1−r) is the proportion of total allowable power units allocated for the communications of all the femto-UEs, then the total power units are evenly allocated for the devices and femto-UEs, respectively. Hence, the allowable power units $PU_{d,i}$ on the i-th subchannel for a device and that $PU_{f,i}$ for a femto-UE can be calculated as $$PU_{d,i} = \frac{rPU_{i,max}^{total}}{N_{DUE,i}} \quad (5)$$

$$PU_{f,i} = \frac{(1-r)PU_{i,max}^{total}}{N_{FUE,i}}. \quad (6)$$

Then, the allowable power units $PU_{d,i}$ and $PU_{f,i}$ each subchannel are broadcast to the D2D devices and femto- UEs, which serve as the resource allocation instructions to assist in adjusting the devices' and femto-UEs' transmission powers.

According to the assistant resource allocation instruction broadcast from the macro-eNB, each device can select the channels and adjust the transmission power for D2D communications. As in (3) and (5), the allowable power units $PU_{d,i}$ of a device can be treated as the allowable amount of device-to-macro interference caused by the device on a subchannel. If $l_{d,M,i}$ is the average link gain of the i-th subchannel between the d-th device and the M-th macro-eNB, then in order to reduce the interference from the devices to the other subsystems, the transmission power on a subchannel of a device is limited to $P_{D2D}^{max}$. Thus, the transmission power of a D2D device on the i-th subchannel can be expressed as $$P_{d,i} = \min\left(P_{D2D,i}^{max}, \frac{PU_{d,i}}{l_{d,M,i}}\right). \quad (7)$$

In the same manner, if the average link gain of the i-th subchannel between the f-th femto-UE and the M-th macro-eNB is $l_{f,M,i}$, the transmission power of a femto-UE on a subchannel can be $$P_{f,i} = \min\left(P_{Femto,i}^{max}, \frac{PU_{f,i}}{l_{f,M,i}}\right) \quad (8)$$

where $P_{Femto,i}^{max}$ is the maximum transmission power for a femto-UE on a subchannel.

To evaluate the link reliability and capacity in a multi-carrier transmission system, the effective SINR for one subchannel composed of multiple subcarriers can be calculated. Let $P_{m,j}$, $P_{f,j}$, $P_{d,j}$ be the transmission power for the m-th macro-UE, the f-th femto-UE, and the d-th D2D device on the j-th subcarrier, respectively. Suppose that the d-th device is transmitting data to the $\hat{d}$-th device with the instantaneous link gain $h_{d,\hat{d},j}$ at the j-th subcarrier. From the viewpoint of the desired receiver (that is, the $\hat{d}$-th device), the instantaneous link gain of the j-th subcarrier from the m-th macro-UE is $h_{m,\hat{d},j}$, and the link gain from the f-th femto-UE is $h_{f,\hat{d},j}$. Consider the three-tier interference. Thus, the SINR of the j-th subcarrier for the D2D transmission from the d-th device to the $\hat{d}$-th device is expressed as $$\gamma_{d,j} = \frac{P_{d,j} h_{d,\hat{d},j}}{P_{m,j} h_{m,\hat{d},j} + \sum_f P_{f,j} h_{f,\hat{d},j} + \sum_{d',d' \neq d} P_{d',j} h_{d',\hat{d},j} + N_0}. \quad (9)$$

The exponential effective SIR mapping (EESM) method can map a vector of the per-subcarrier SINRs to a single AWGN-equivalent SINR for a subchannel. If $N_d$ subcarriers in a subchannel; and the SINR of each subcarrier, $\gamma_1$, $\gamma_2$, ..., and $\gamma_{N_d}$, then the effective SINR $\gamma_{eff,i}$ for the subchannel can be calculated by $$\gamma_{eff,i}(\gamma_1, \gamma_2, \ldots, \gamma_{N_d}) = -\beta \ln \frac{1}{N_d} \sum_{j=1}^{N_d} e^{\frac{-\gamma_j}{\beta}} \quad (10)$$

where $\beta$ is an EESM calibration factor.

Once the effective SINR $\gamma_{eff,i}$ is obtained, the modulation-coding scheme (MCS) and the achievable spectrum efficiency $\eta_i$ for the subchannel can be determined, according to the minimum SINR requirement. For example, if the effective SINR is $\gamma_{eff,i}$=5 dB, QPSK modulation with the code rate ½ can be used as the modulation coding scheme. The corresponding spectrum efficiency for the subchannel is $\eta_i$=1 (bps/Hz).

The link reliability is defined as the probability that the effective SINR is larger than the SINR outage threshold $\Gamma_{th}$. Suppose that the d-th device uses $N_{subch,d}^{(used)}$ subchannels for D2D communications. Hence, the average link reliability for the D2D device can be given as $$R_D = \frac{1}{N_{subch,d}^{(used)}} \sum_{i=1}^{N_{subch}} \epsilon_i Pr[\gamma_{eff,i} \geq \Gamma_{th}], \quad (11)$$

where $\epsilon_i$ is a utility function. If the i-th subchannel is used by the device, $\epsilon_i$=1; otherwise, $\epsilon_i$=0. Since one device can use at most $\rho_D N_{subch}$ subchannels, $\Sigma_{i=1}^{N_{subch}} \epsilon_i = N_{subch,d}^{(used)} \leq \rho_D N_{subch}$. By the same method in (9)~(11), the average link reliability $R_M$ and $R_F$ for the macro-UE and the femto-UE can be calculated, respectively.

The D2D capacity is defined as the aggregate throughput of a D2D device using multiple subchannels to perform D2D communications, which depends on the number of subchannels. Let $N_{subch,d}^{(used)}$ be the number of subchannels used by a D2D device. According to the effective SINR, the MCS and the spectrum efficiency $\eta_i$ for each used subchannel can be determined. If the bandwidth of a subchannel is $B_{subch}$, the D2D capacity $C_D$ of one device can be calculated as $$C_D = \sum_{i=1}^{N_{subch}} \epsilon_i \eta_i B_{subch}, \quad (12)$$

then by the same method, the macro capacity $C_M$, and the femto capacity $C_F$ of the femto-UE can be found. Each femto-UE and device can use multiple subchannels. However, a macro-UE can occupy only one subchannel for data communication. Thus, the macro capacity $C_M$ is defined as the aggregate throughput of all the macro-UEs in a macro-cell. The total capacity $C_T$ of a heterogeneous system can be defined as $$C_T = C_M + C_F + C_D. \quad (13)$$

Referring now to FIG. 1, illustrated is a network assisted device-decided resource allocation method according to one or more embodiments. The NADD method can comprise a first pair of devices 102 104 seeking to communicate with each other via message delivery 112. To facilitate the message delivery 112, a transmitting device 104 can transmit a favorite channel list 106 to a macro-eNB network device 114. According to the favorite channel list 106 transmitted by the transmitting device 104, the macro-eNB network device 114 can calculate maximum allowable power unit data 108 of the transmitting device 104 as a resource instruction and broadcasts it to the transmitting device 104. Thus, the macro-eNB network device can assist the D2D transmitting device 104 in adjusting power to control the device-to-macro interference. Based on the allowable power unit data 108, the transmitting device 104 can a select sub-channel and a transmission power 110 for delivering a message to the receiving device 102.

The NADD method can concurrently comprise a second pair of devices 116 118 seeking to communicate with each via message delivery 124. To facilitate the message delivery 124, a transmitting device 118 can transmit a favorite channel list 120 to a macro-eNB network device 114. According to the favorite channel list 120 transmitted by the transmitting device 118, the macro-eNB network device 114 can calculate maximum allowable power unit data 120 of the transmitting device 118 as a resource instruction and broadcasts it to the transmitting device 118. Thus, the macro-eNB network device can assist the D2D transmitting device 118 in adjusting power to control the device-to-macro interference. Based on the allowable power unit data 120, the transmitting device 118 can a select sub-channel and a transmission power 122 for delivering a message to the receiving device 116.

Figure 2:
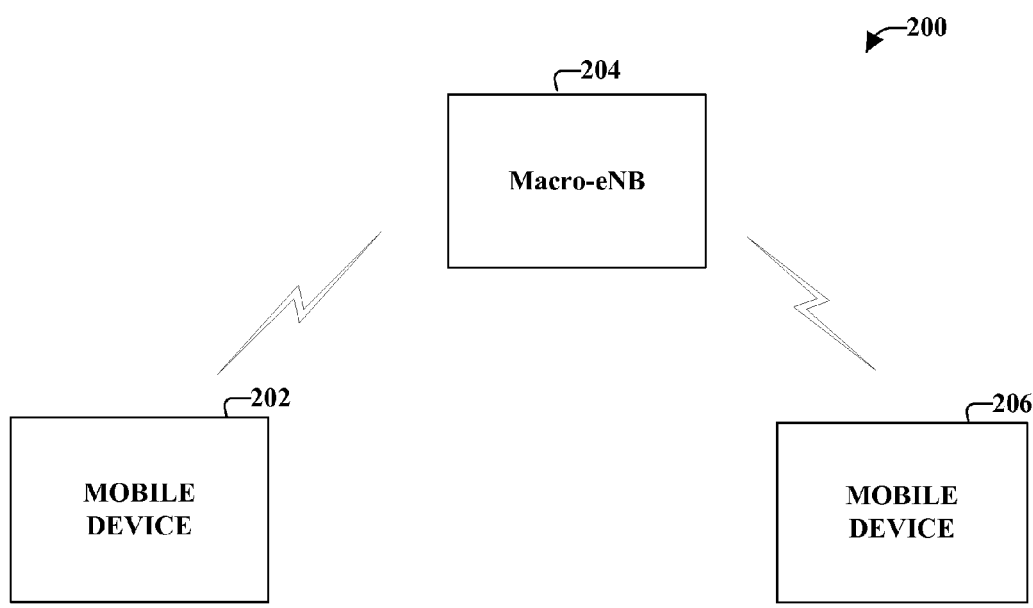
FIG. 2 illustrates a system for macro-eNB network communicating with mobile devices according to one or more embodiments.

Referring now to FIG. 2, illustrated is a system for macro-eNB network communicating with mobile devices according to one or more embodiments. The NADD method can assist a macro-eNB network 200 comprising mobile devices 202 206 and a macro-eNB device 204, wherein communication between the macro-eNB device 204 and the mobile devices 202 206 can facilitate a more efficient network. To facilitate message delivery from the mobile devices 202 206, the mobile devices 202 206 can transmit a favorite channel list to the macro-eNB network device 204. According to the favorite channel list transmitted by the mobile devices 202 206, the macro-eNB network device 204 can calculate maximum allowable power unit data of mobile devices 202 206 as a resource instruction and broadcast it to the mobile devices 202 206. Thus, the macro-eNB network device 204 can assist the mobile devices 202 206 in adjusting power to control the device-to-macro interference. Based on the allowable power unit data, the mobile devices 202 206 can a select sub-channel and a transmission power for delivering a message another mobile device.

Figure 3:
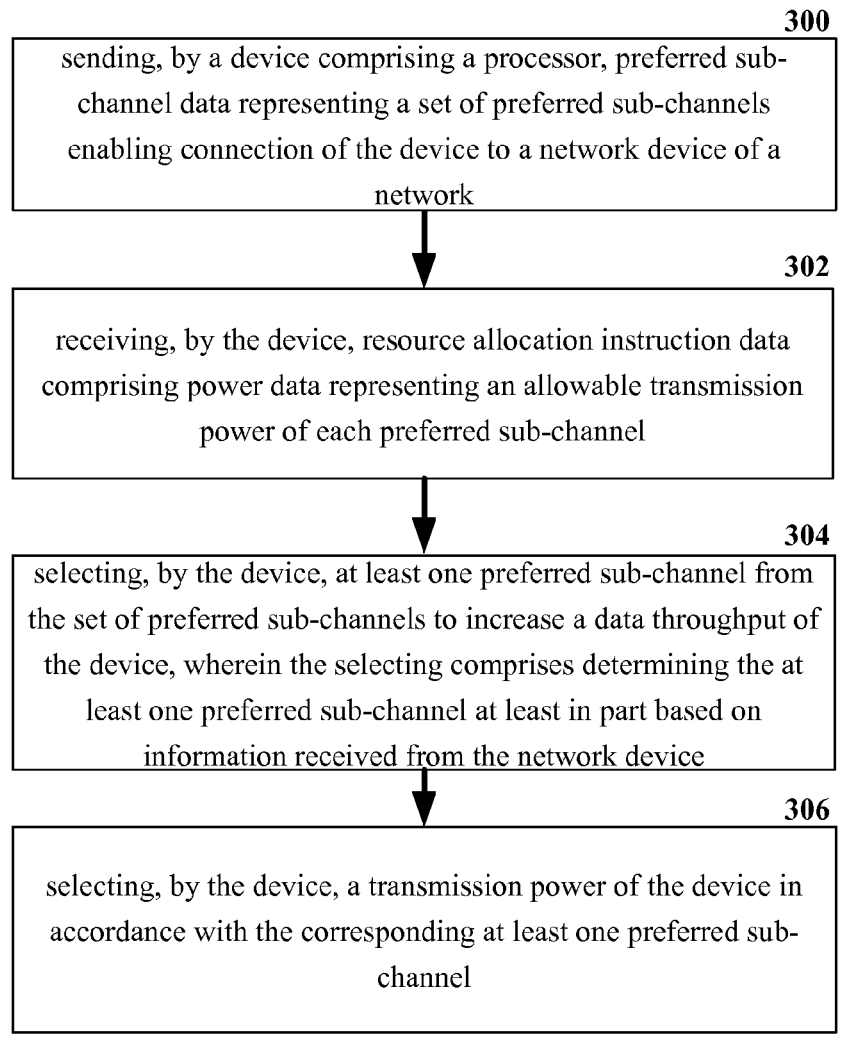
FIG. 3 illustrates a schematic system block diagram of a method for selecting a sub-channel and transmission power according to one or more embodiments.

Referring now to FIG. 3, illustrated is a schematic system block diagram of a method for selecting a sub-channel and transmission power according to one or more embodiments. At element 300 preferred sub-channel data representing a set of preferred sub-channels can be sent to enable connection of a device to a network device of a network. The preferred sub-channels can be transmitted via a favorite channel list. At element 302, resource allocation instruction data comprising power data representing an allowable transmission power of each preferred sub-channel can be received. Thus, the device can receive maximum allowable power unit data of sub-channels from a macro-eNB network device.

At element 304 the device can select at least one preferred sub-channel from the set of preferred sub-channels to increase a data throughput of the device, wherein the selecting comprises determining the at least one preferred sub-channel at least in part based on information received from the network device. The device can select a sub-channel and/or a transmission power to enhance D2D throughput. Thus, at element 306 the device can select a transmission power in accordance with the corresponding at least one preferred sub-channel.

Figure 4:
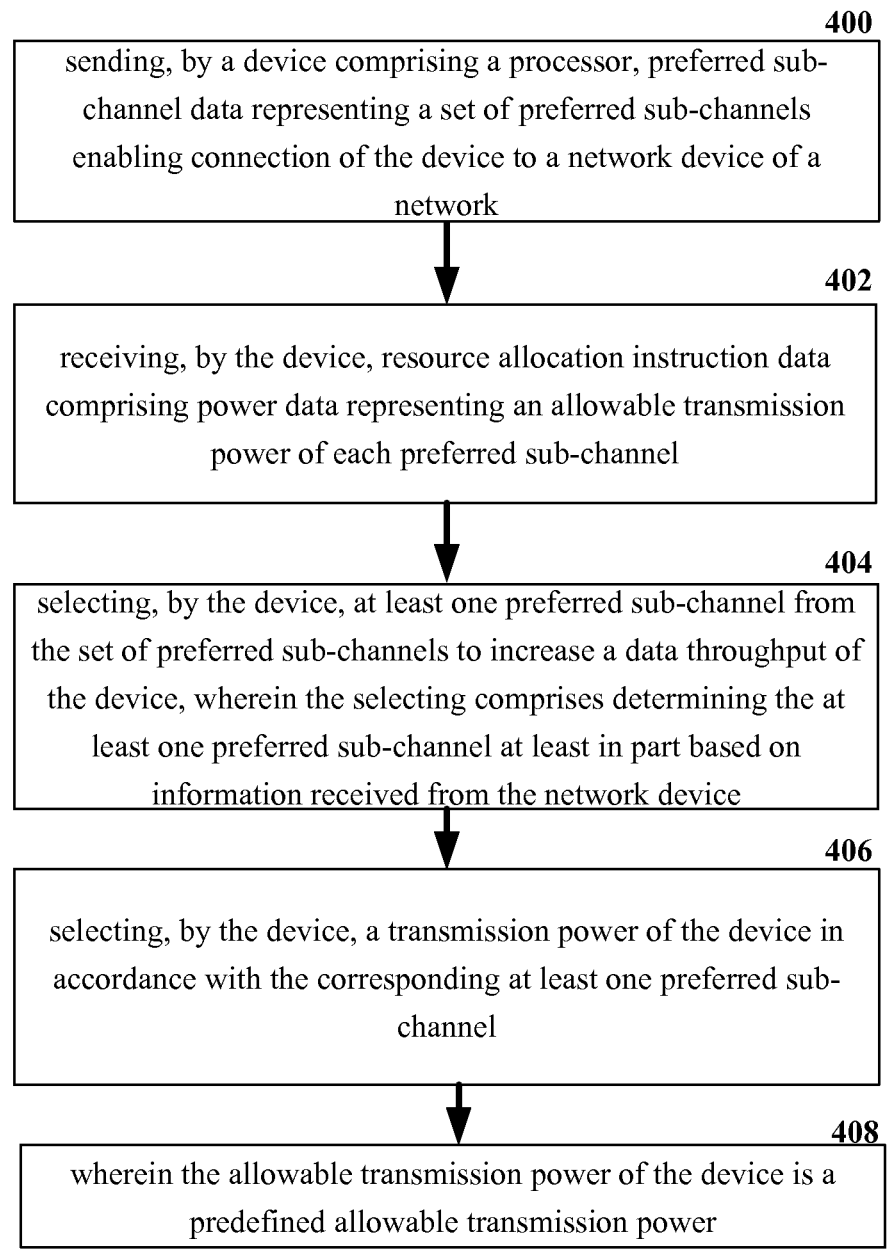
FIG. 4 illustrates a schematic system block diagram of a method for selecting a sub-channel and a pre-defined transmission power according to one or more embodiments.

Referring now to FIG. 4, illustrated is a schematic system block diagram of a method for selecting a sub-channel and a pre-defined transmission power according to one or more embodiments. At element 400 preferred sub-channel data representing a set of preferred sub-channels can be sent to enable connection of a device to a network device of a network. The preferred sub-channels can be transmitted via a favorite channel list. At element 402, resource allocation instruction data comprising power data representing an allowable transmission power of each preferred sub-channel can be received. Thus, the device can receive maximum allowable power unit data of sub-channels from a macro-eNB network device.

At element 404 the device can select at least one preferred sub-channel from the set of preferred sub-channels to increase a data throughput of the device, wherein the selecting comprises determining the at least one preferred sub-channel at least in part based on information received from the network device. The device can select a sub-channel and/or a transmission power to enhance D2D throughput. Thus, at element 406 the device can select a transmission power in accordance with the corresponding at least one preferred sub-channel, wherein the allowable transmission power of the device is a predefined allowable transmission power at element 408.

Figure 5:
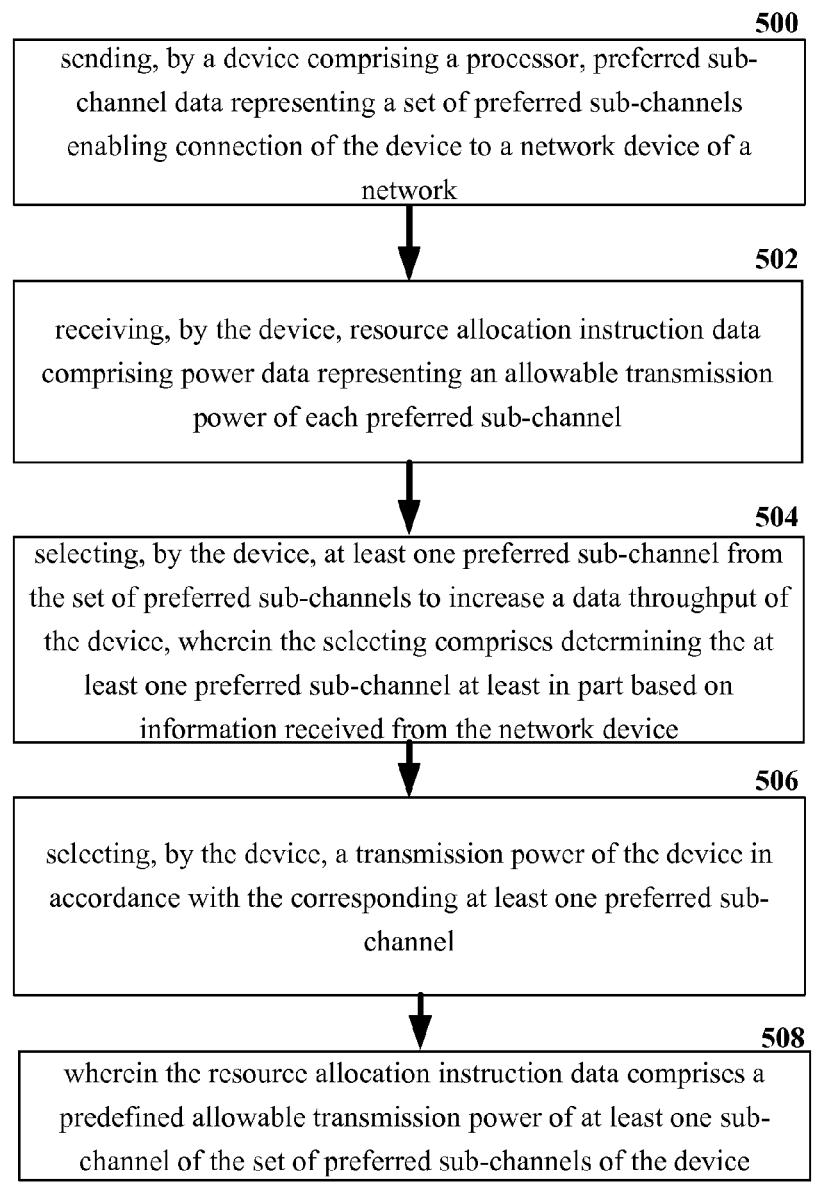
FIG. 5 illustrates a schematic system block diagram of a method for selecting a preferred sub-channel and a pre-defined transmission power according to one or more embodiments.

Referring now to FIG. 5, illustrated is a schematic system block diagram of a method for selecting a preferred sub-channel and a pre-defined transmission power according to one or more embodiments. At element 500 preferred sub-channel data representing a set of preferred sub-channels can be sent to enable connection of a device to a network device of a network. The preferred sub-channels can be transmitted via a favorite channel list. At element 502, resource allocation instruction data comprising power data representing an allowable transmission power of each preferred sub-channel can be received. Thus, the device can receive maximum allowable power unit data of sub-channels from a macro-eNB network device.

At element 504 the device can select at least one preferred sub-channel from the set of preferred sub-channels to increase a data throughput of the device, wherein the selecting comprises determining the at least one preferred sub-channel at least in part based on information received from the network device. The device can select a sub-channel and/or a transmission power to enhance D2D throughput. Thus, at element 506 the device can select a transmission power in accordance with the corresponding at least one preferred sub-channel, wherein the resource allocation instruction data comprises a predefined allowable transmission power of at least one sub-channel of the set of preferred sub-channels of the device at element 508.

Figure 6:
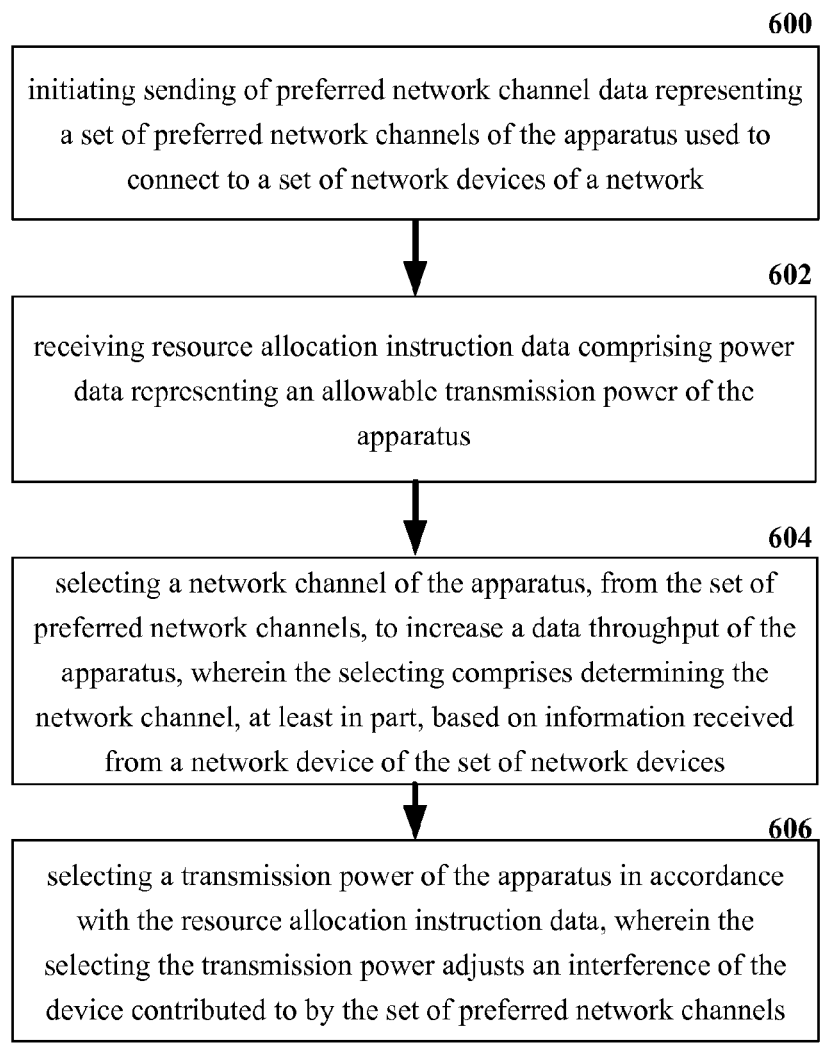
FIG. 6 illustrates a schematic system block diagram of an apparatus for selecting a sub-channel and transmission power according to one or more embodiments.

Referring now to FIG. 6, illustrated is a schematic system block diagram of an apparatus for selecting a sub-channel and transmission power according to one or more embodiments. At element 600 the apparatus can initiate sending of preferred network channel data representing a set of preferred network channels of the apparatus used to connect to a set of network devices of a network. The preferred sub-channels can be transmitted via a favorite channel list. The apparatus can receive resource allocation instruction data comprising power data representing an allowable transmission power of the apparatus at element 602. Therefore, apparatus can receive resource allocation instruction data related to a network channel from a macro-eNB network device.

At element 604, the apparatus can also select a network channel of the apparatus, from the set of preferred network channels, to increase a data throughput of the apparatus, wherein the selecting comprises determining the network channel, at least in part, based on information received from a network device of the set of network devices. Consequently, the apparatus can select a channel and/or a transmission power to enhance D2D throughput. Therefore, the apparatus can select a transmission power in accordance with the resource allocation instruction data, at element 606, wherein the selecting the transmission power adjusts an interference of the device contributed to by the set of preferred network channels.

Figure 7:
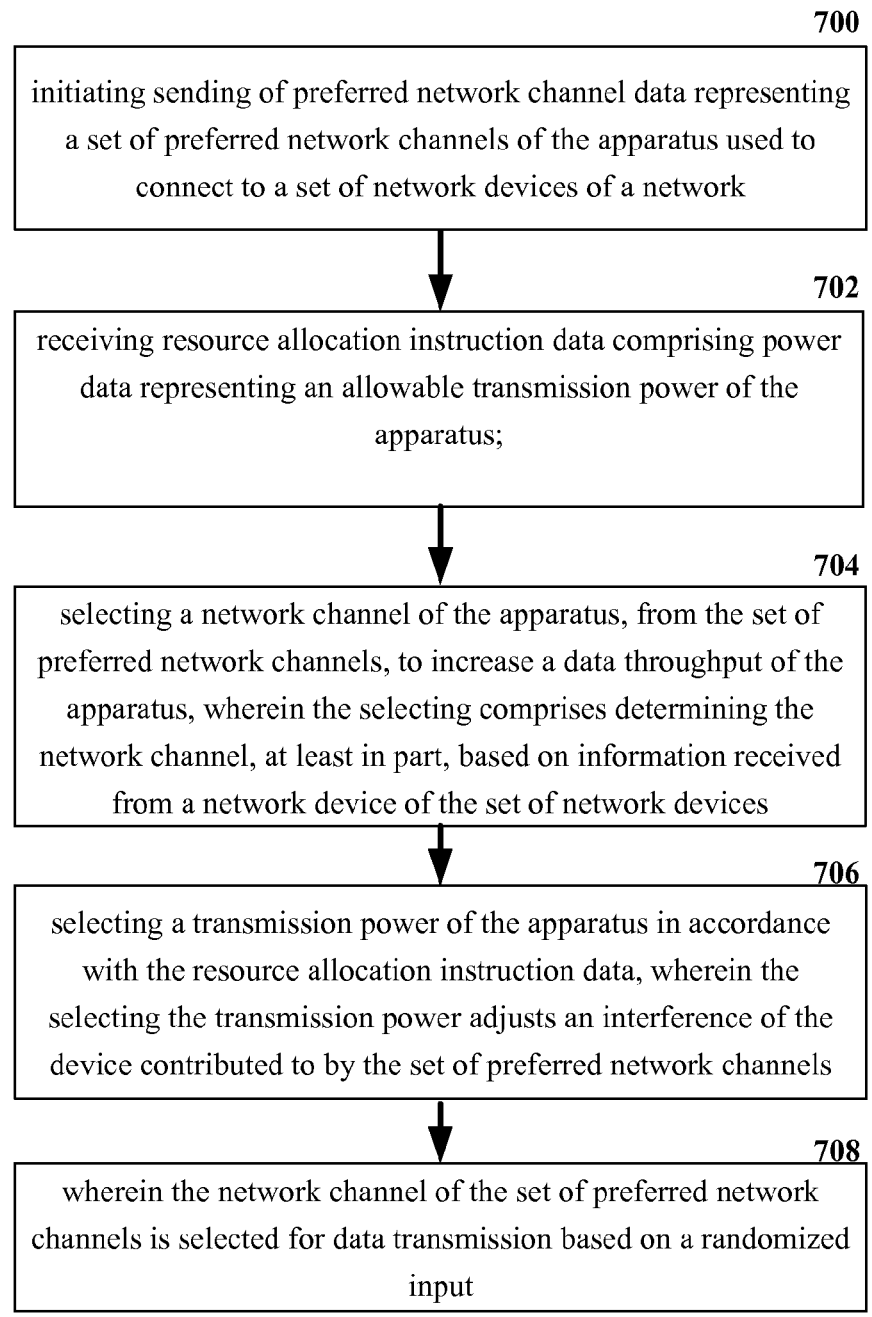
FIG. 7 illustrates a schematic system block diagram of an apparatus for selecting a sub-channel and transmission power for adjusting a network channel selected based on a randomized input according to one or more embodiments.

Referring now to FIG. 7, illustrated is a schematic system block diagram of an apparatus for selecting a sub-channel and transmission power for adjusting a network channel selected based on a randomized input according to one or more embodiments. At element 700 the apparatus can initiate sending of preferred network channel data representing a set of preferred network channels of the apparatus used to connect to a set of network devices of a network. The preferred sub-channels can be transmitted via a favorite channel list. The apparatus can receive resource allocation instruction data comprising power data representing an allowable transmission power of the apparatus at element 702. Therefore, apparatus can receive resource allocation instruction data related to a network channel from a macro-eNB network device.

At element 704, the apparatus can also select a network channel of the apparatus, from the set of preferred network channels, to increase a data throughput of the apparatus, wherein the selecting comprises determining the network channel, at least in part, based on information received from a network device of the set of network devices. Consequently, the apparatus can select a channel and/or a transmission power to enhance D2D throughput. Therefore, the apparatus can select a transmission power in accordance with the resource allocation instruction data, at element 706, wherein the selecting the transmission power adjusts an interference of the device contributed to by the set of preferred network channels and wherein the network channel of the set of preferred network channels is selected for data transmission based on a randomized input at element 708.

Figure 8:
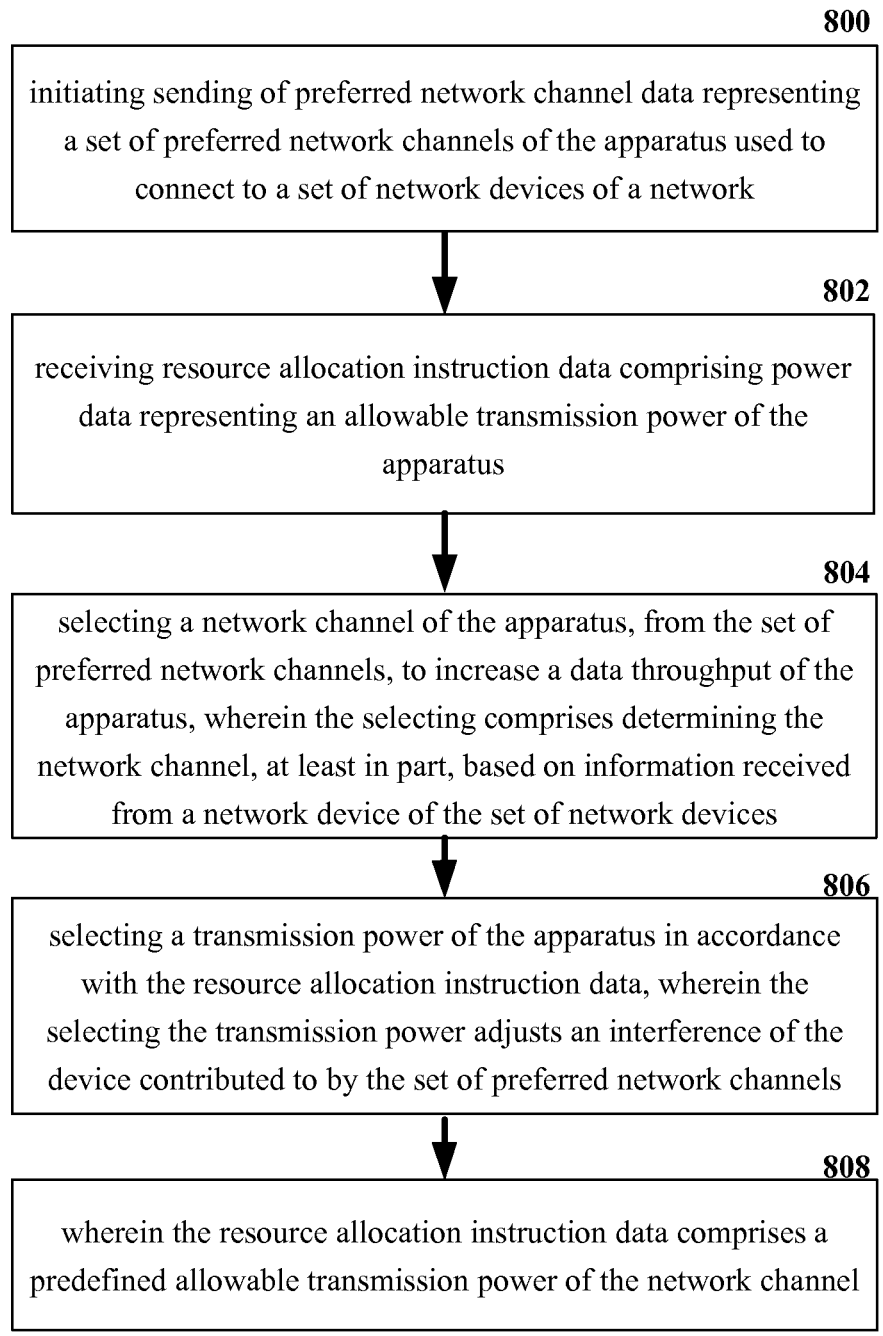
FIG. 8 illustrates a schematic system block diagram of an apparatus for selecting a preferred sub-channel and a pre-defined transmission power according to one or more embodiments.

Referring now to FIG. 8, illustrated is a schematic system block diagram of an apparatus for selecting a preferred sub-channel and a pre-defined transmission power according to one or more embodiments. At element 800 the apparatus can initiate sending of preferred network channel data representing a set of preferred network channels of the apparatus used to connect to a set of network devices of a network. The preferred sub-channels can be transmitted via a favorite channel list. The apparatus can receive resource allocation instruction data comprising power data representing an allowable transmission power of the apparatus at element 802. Therefore, apparatus can receive resource allocation instruction data related to a network channel from a macro-eNB network device.

At element 804, the apparatus can also select a network channel of the apparatus, from the set of preferred network channels, to increase a data throughput of the apparatus, wherein the selecting comprises determining the network channel, at least in part, based on information received from a network device of the set of network devices. Consequently, the apparatus can select a channel and/or a transmission power to enhance D2D throughput. Therefore, the apparatus can select a transmission power in accordance with the resource allocation instruction data, at element 806, wherein the selecting the transmission power adjusts an interference of the device contributed to by the set of preferred network channels and wherein the resource allocation instruction data comprises a predefined allowable transmission power of the network channel at element 808.

Figure 9:
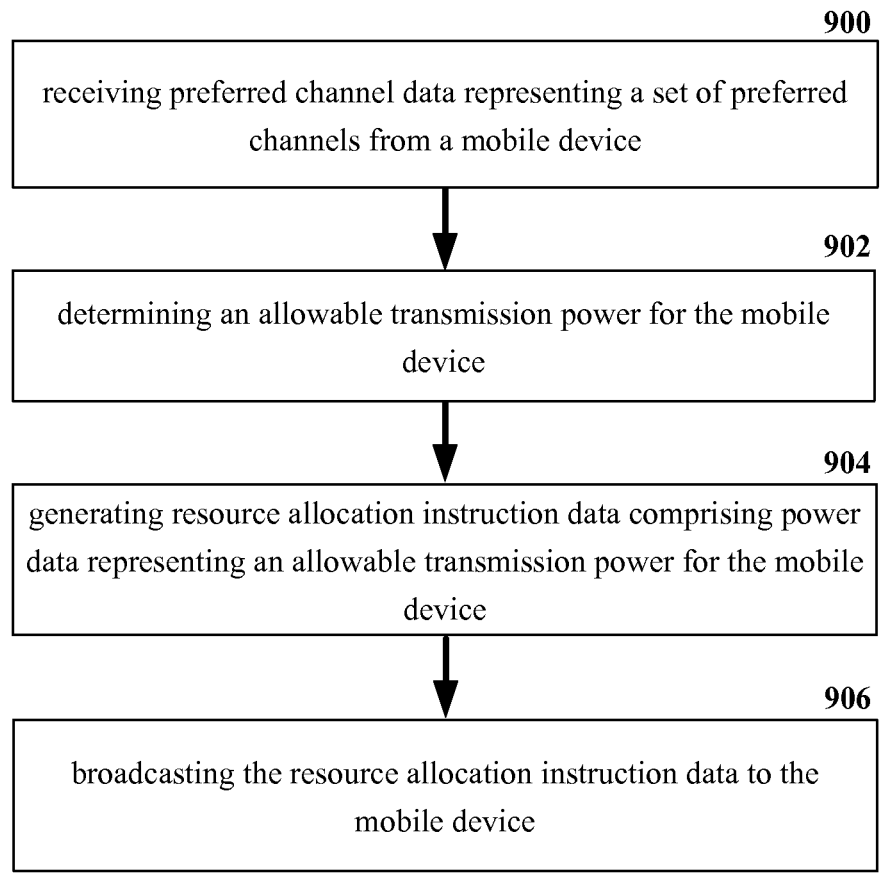
FIG. 9 illustrates a schematic system block diagram of a device for broadcasting resource allocation instruction data according to one or more embodiments.

Referring now to FIG. 9, illustrated is a schematic system block diagram of a device for broadcasting resource allocation instruction data according to one or more embodiments. At element 900 the device can receive preferred channel data representing a set of preferred channels from a mobile device, and determine an allowable transmission power for the mobile device at element 902. Preferred channels can be transmitted via a favorite channel list of the mobile device. The device can also generate resource allocation instruction data comprising power data representing an allowable transmission power for the mobile device at element 904. Furthermore, the device can broadcast the resource allocation instruction data to the mobile device at element 906 so that the mobile device can select a channel and/or a transmission power to enhance a D2D throughput.

Figure 10:
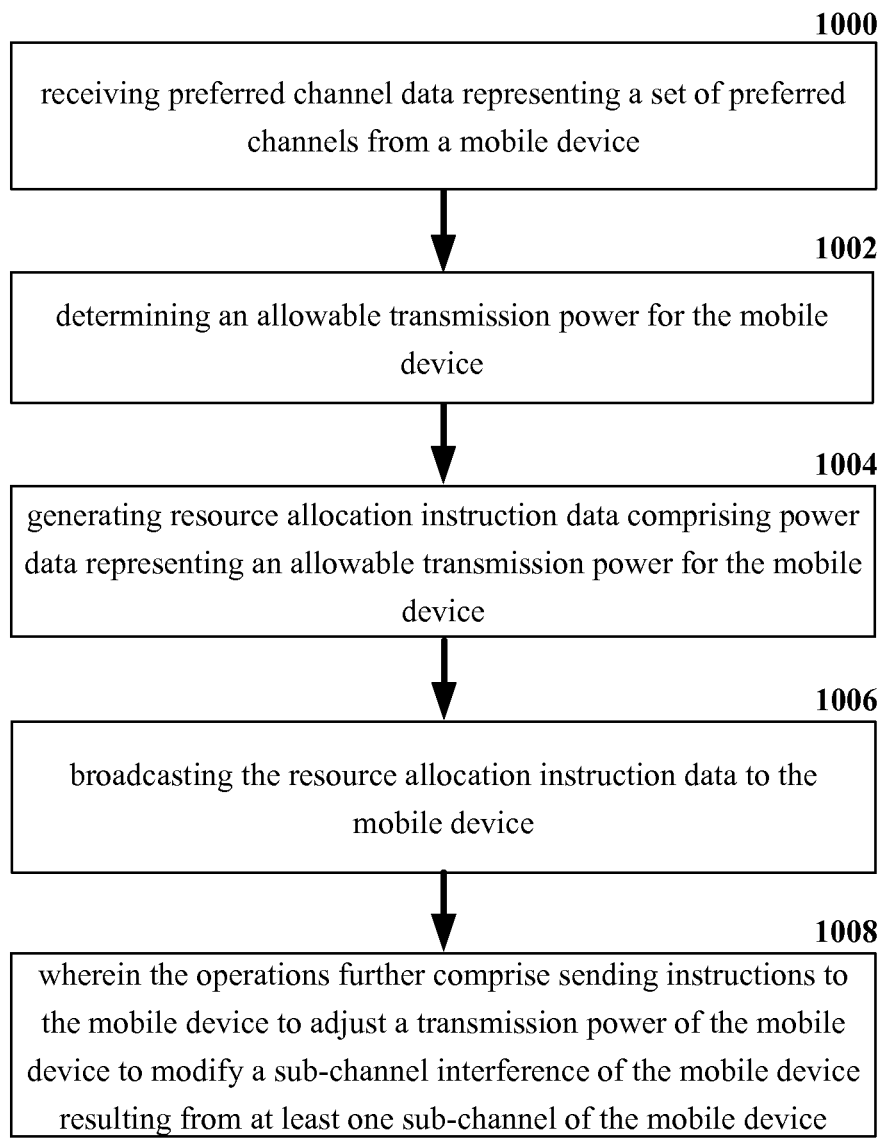
FIG. 10 illustrates a schematic system block diagram of a device for broadcasting resource allocation instruction data and sending instructions to adjust a transmission power according to one or more embodiments.

Referring now to FIG. 10, illustrated is a schematic system block diagram of a device for broadcasting resource allocation instruction data and sending instructions to adjust a transmission power according to one or more embodiments. At element 1000 the device can receive preferred channel data representing a set of preferred channels from a mobile device, and determine an allowable transmission power for the mobile device at element 1002. Preferred channels can be transmitted via a favorite channel list of the mobile device. The device can also generate resource allocation instruction data comprising power data representing an allowable transmission power for the mobile device at element 1004. Furthermore, the device can broadcast the resource allocation instruction data to the mobile device at element 1006 so that the mobile device can select a channel and/or a transmission power to enhance a D2D throughput. Consequently, the operations can further comprise sending instructions to the mobile device to adjust a transmission power of the mobile device to modify a sub-channel interference of the mobile device resulting from at least one sub-channel of the mobile device at element 1008.

Figure 11:
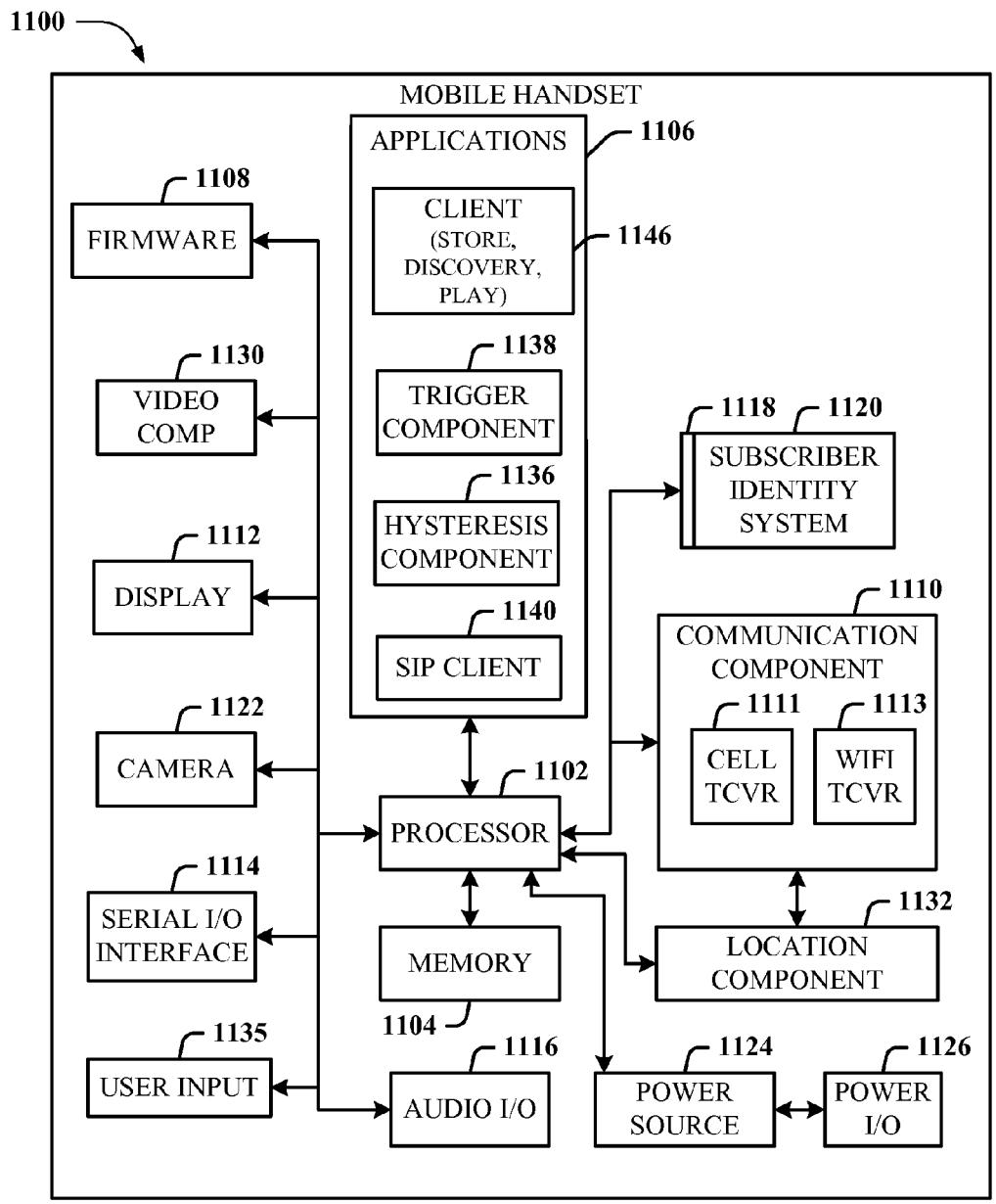
FIG. 11 illustrates a block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
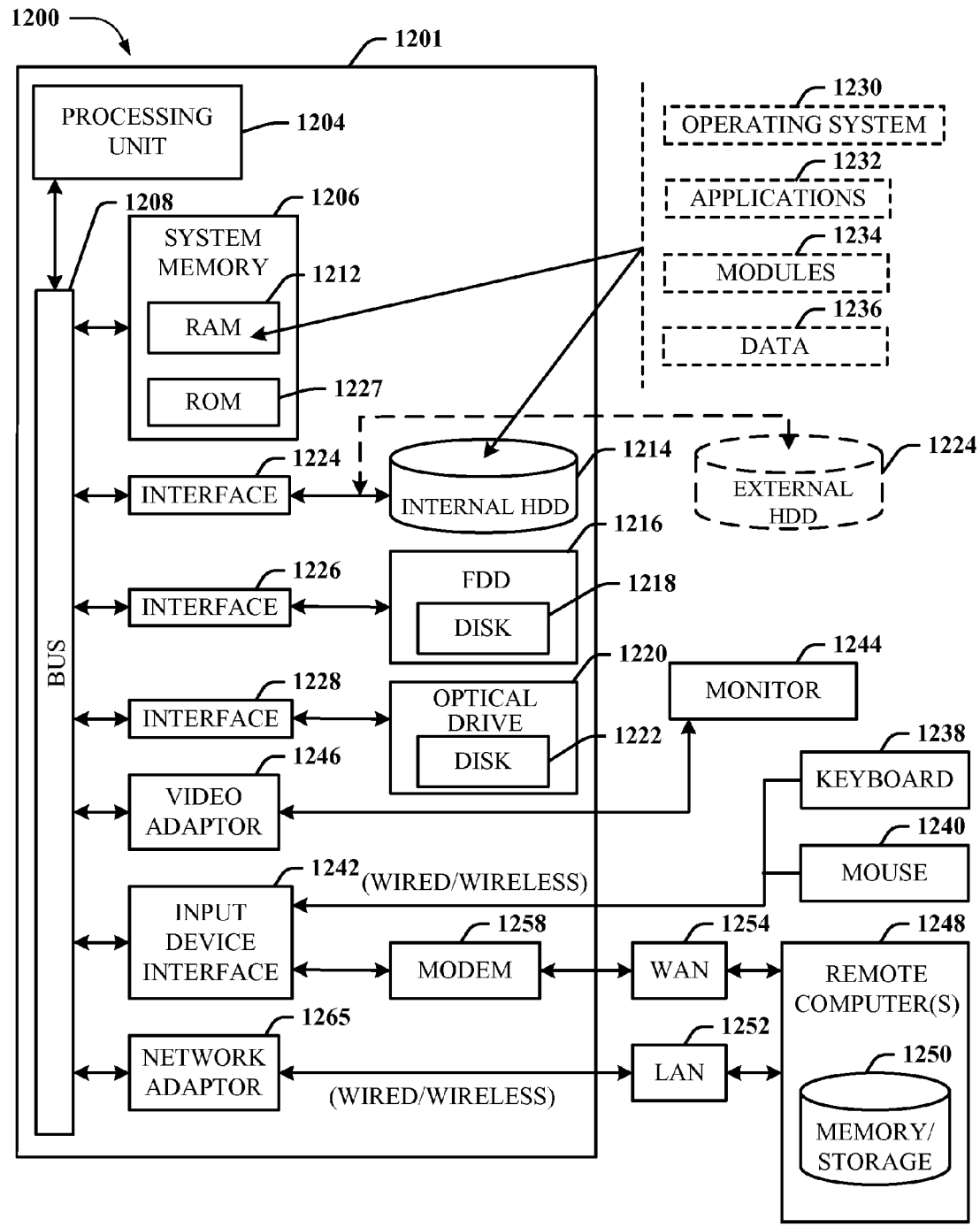
FIG. 12 illustrates a block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    sending, by a device comprising a processor, preferred sub-channel data representing a set of preferred sub-channels enabling connection of the device to a network device of a network;
    receiving, by the device, resource allocation instruction data comprising power data representing an allowable transmission power of each preferred sub-channel;
    selecting, by the device, at least one preferred sub-channel from the set of preferred sub-channels to increase a data throughput of the device, wherein the selecting comprises determining the at least one preferred sub-channel at least in part based on information received from the network device; and
    selecting, by the device, a transmission power of the device in accordance with the at least one preferred sub-channel, wherein the selecting the transmission power comprises selecting the transmission power based on data link gain information and a sub-channel usage ratio, wherein the sub-channel usage ratio is a ratio of a number of allowable sub-channels of the device to a total number of sub-channels of the device.

2. The method of claim 1, wherein the allowable transmission power of the device is a predefined allowable transmission power.

3. The method of claim 1, wherein the resource allocation instruction data comprises a predefined allowable transmission power of at least one sub-channel of the set of preferred sub-channels of the device.

4. The method of claim 1, wherein the selecting the at least one preferred sub-channel comprises randomly or pseudo-randomly selecting the at least one preferred sub-channel for a data transmission.

5. The method of claim 1, wherein the selecting the at least one preferred sub-channel comprises selecting the at least one preferred sub-channel based on data link information of the device.

6. The method of claim 1, wherein the selecting the at least one preferred sub-channel comprises selecting the at least one preferred sub-channel based on a sub-channel usage ratio wherein the sub-channel usage ratio is a ratio of a number of allowable sub-channels of the device to a total number of sub-channels of the device.

7. The method of claim 1, wherein the selecting the at least one preferred sub-channel comprises selecting the at least one preferred sub-channel in response to receiving the resource allocation instruction data from the network device.

8. The method of claim 1, wherein the preferred sub-channel data comprises gain information of a data link throughput.

9. The method of claim 1, wherein the selecting the transmission power comprises decreasing the transmission power of the device to decrease the sub-channel interference of the device.

\* \* \* \* \*